Figure 1:
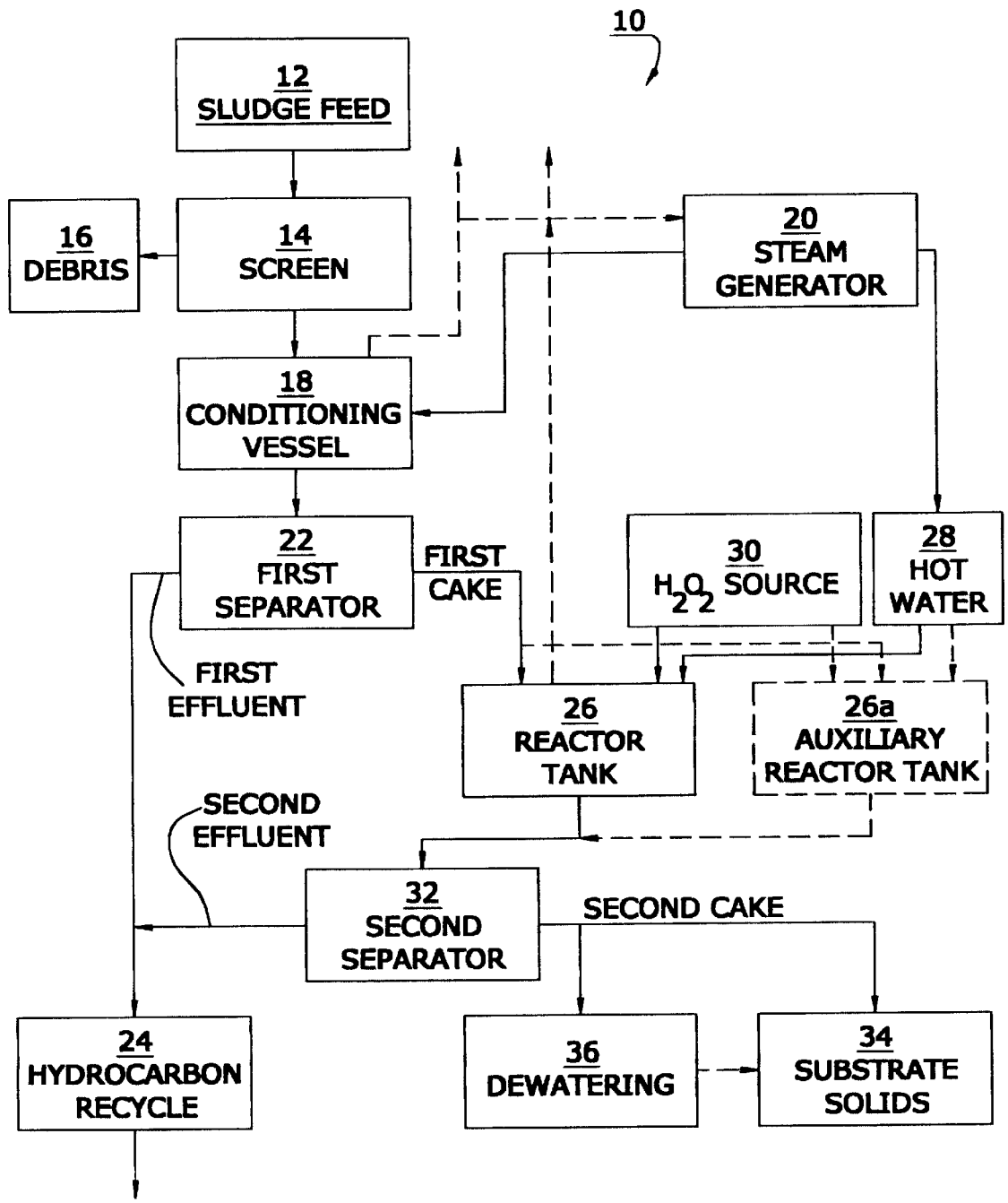

United States Patent

Conaway

[11] Patent Number: 6,096,227
[45] Date of Patent: Aug. 1, 2000

[54] SYSTEM FOR PROCESSING INDUSTRIAL SLUDGES

[75] Inventor: Lawrence M. Conaway, Niagra Falls, N.Y.

[73] Assignee: Continuum Environmental, Inc., Niagara Falls, N.Y.

[21] Appl. No.: 09/304,377

[22] Filed: May 4, 1999

Related U.S. Application Data

[63] Continuation-in-part of application No. 08/971,514, Nov. 17, 1997, Pat. No. 5,928,522, which is a continuation-in-part of application No. 08/807,643, Feb. 27, 1997, Pat. No. 5,797,701.

[51] Int. Cl.[7] .................................................. G02F 1/72
[52] U.S. Cl. ........................ 210/759; 210/766; 210/768; 210/774; 210/806
[58] Field of Search .................................... 210/759, 758, 210/766, 768, 774, 908, 909, 806; 588/2.8

[56] References Cited

U.S. PATENT DOCUMENTS

| | | | |
|---|---|---|---|
| 4,861,497 | 8/1989 | Welch et al. | 210/759 |
| 5,762,809 | 7/1998 | Luft et al. | 210/759 |
| 5,797,701 | 8/1998 | Conaway | 210/759 |
| 5,928,522 | 7/1999 | Conoway | 210/759 |

FOREIGN PATENT DOCUMENTS 0 680 931 A1   5/1995   European Pat. Off. .

*Primary Examiner*—David A. Reifsnyder
*Attorney, Agent, or Firm*—Harris Beach & Wilcox, LLP

[57] ABSTRACT

A system for treating industrial sludges to recover a hydrocarbon portion and a solid particulate substrate portion. A sludge feedstock is screened to remove large particles and is diluted to between about 5% and about 50% solids to form a slurry. The slurry is agitated and heated to 180° F. or higher for a time sufficient to melt waxy hydrocarbon solids, reduce the viscosity of the slurry, reduce the density of hydrocarbons within the slurry, and break surface adhesion of hydrocarbon compounds to substrate particles. In a first separation step, the substrate particles are separated from a first liquid effluent containing most of the hydrocarbons from the original sludge, which may be further processed for recycle use. A first residual substrate cake is redispersed in hot water to form a second slurry and is treated with an amount of hydrogen peroxide for a time sufficient to lyse and/or liberate residual hydrocarbon compounds and to oxidize toxic polycyclic aromatic hydrocarbons to non-toxic derivatives. The second slurry is passed through a second separation step, yielding a second liquid effluent which may be combined with the first liquid effluent for recovery processing of the hydrocarbons. The second residual substrate cake may be disposed of, as by landfilling, or further processed to recover valuable material in the substrate.

2 Claims, 1 Drawing Sheet

SYSTEM FOR PROCESSING INDUSTRIAL SLUDGES

The present application is a Continuation-In-Part of my pending application, Ser. No. 08/971,514 filed Nov. 17, 1997 now U.S. Pat. No. 5,928,522 which is a Continuation-In-Part of my application, Ser. No. 08/807,643 filed Feb. 27, 1997, now matured as U.S. Pat. No. 5,797,701 issued Aug. 25, 1998.

DESCRIPTION

The present invention relates to methods and apparatus for treatment of contaminated substrates to recover hydrocarbons therefrom, and more particularly to a system (methods and apparatus) for processing of hydrocarbon-contaminated materials such as metal, ceramic, or plastic substrates in industrial sludges to recover hydrocarbons therefrom and to render the substrate residues suitable for environmentally-acceptable disposal or recycle use.

Industrial sludges may be generated by many manufacturing processes, for example, tool and die operations; casting and molding operations; grinding, cutting, and finishing operations; electroplating operations; foundries; mining operations. Some sludges can comprise metal turnings, filings, shavings, or other finely-divided metal pieces coated with a hydrocarbon-based oil lubricant used in the operation. Other sludge substrates may comprise, for example, hydrocarbon-contaminated ceramics, minerals, glasses, plastics, or ores.

Such sludges represent a significant source for recycle of both the substrate components and the hydrocarbons, but are frequently either burned to recover the substrate, which wastes the hydrocarbon component, or landfilled, which wastes both components. Economic recovery of both substrate and hydrocarbon may not be generally available via known treatment methods.

Over the past few years, disposal regulations have become more stringent and cost of processing hydrocarbon-contaminated sludges has escalated. Both of these trends may be expected to continue in the future. Current technologies for dealing with sludge waste can be very expensive to implement and may be inadequate to meet current and future regulations.

It is a principal object of the invention to provide an improved process for treating industrial sludges which recovers the substrate portion in a substantially hydrocarbon-free state.

It is a further object of the invention to provide an improved sludge treatment process which can provide a residual solid fraction for disposal which can be delisted under RCRA and applicable international guidelines for landfill disposal.

It is a further object of the invention to provide an improved process for treating industrial sludges which can readily separate hydrocarbon compounds from substrates and thereby recover a high percentage of the hydrocarbons therein.

It is a still further object of the invention to provide an improved process for treating industrial sludges which is less expensive to operate on a per-unit of sludge basis than known treatment processes.

It is a still further object of the invention to provide an improved process for treating industrial sludges which is easily retrofittable to existing facilities.

Briefly described, I have found that my processes for remediation of hydrocarbon-contaminated soils as disclosed in my U.S. Pat. No. 5,797,701, and for treatment of oil refinery wastes as disclosed in my pending parent application Ser. No. 08/971,514, now U.S. Pat. No. 5,928,522 may be readily adapted as described herein to the treatment of industrial sludges to recover one or both of the substrate and the hydrocarbon component therefrom. The relevant disclosure of U.S. Pat. No. 5,797,701 is hereby incorporated by reference.

In an industrial sludge treatment system embodying the invention, sludge to be treated may first be screened to remove large particles and then is diluted with water to a solids weight percent of between about 5% and about 50% to form a waste slurry of fluidized solid particulate material. In a conditioning tank, the slurry is conditioned by agitation and heating to 180° F. or higher for a time sufficient to melt waxy hydrocarbon solids, reduce the viscosity of the batch, reduce the density of hydrocarbon fractions within the batch, and begin to break surface adhesion of hydrocarbon compounds to substrate surfaces. The thus-conditioned slurry is subjected to a first separation step, for example, via gravity separation and decanting of liquid from the conditioning vessel or by being passed through a first separator comprising, for example, a filter press or screen or preferably a cyclone separator or centrifuge. Typically, greater than about 80% of the volume is thus separated, and the first liquid effluent which contains most of the hydrocarbon residues from the original sludge may be removed and treated as described infra. The residual substrate cake from the first separation, which may still contain about 5% hydrocarbons, is dispersed in hot water to form a second slurry and is treated with an oxidant, preferably hydrogen peroxide, in an amount and for a time sufficient to lyse and liberate the hydrocarbon compounds bound to the substrate. The second slurry is subjected to a second separation to yield a second liquid effluent and a second substrate cake. The second liquid effluent may be combined with the first liquid effluent from the first separation for conventional recovery of the hydrocarbons therein. The second residual substrate cake which may contain about 0.5% or less of hydrocarbons may be landfilled directly if desired, further dewatered as needed to meet disposal requirements, or further processed conventionally for recycling of the substrate.

The foregoing and other objects, features, and advantages of the invention, as well as presently preferred embodiments thereof, will become more apparent from a reading of the following description in connection with the accompanying drawing of which FIG. 1 is a schematic diagram of a system for processing industrial sludges in accordance with the invention.

The objectives of the subject process are:

a) to accommodate industrial sludges having a wide range of included substrate particles, including metal, ceramic, glass, mineral, and plastic turnings, grindings, shavings and the like, such sludges having a wide range of compositions and possibly including, for example, light oil fractions, heavy oil fractions, greases, silicones, abrasives, salts, sulfur and sulfur compounds, and various aliphatic and/or aromatic hydrocarbons;

b) to liberate and recover virtually all of the petroleum content of the sludges and to return it for recycling;

c) to liberate and recover virtually all of the valuable substrate content of the sludges and to return it for recycling;

d) to carry out such liberation and recovery without resort to flocculants or filter aids such as diatomaceous earth or polymers;

e) to carry out such liberation and recovery while suppressing formation and evolution of hydrogen sulfide;

f) to convert toxic substances in the sludge into non-toxic derivatives;

g) to yield a residual cake of substrate which is substantially free of hydrocarbon residues (0.5% or less) and which may be delistable and suitable for disposal in accordance with US and international government regulations; and f) to meet all of the above objectives efficiently and economically.

Referring to FIG. 1, there is shown an industrial sludge treatment system 10 embodying the invention. Since sludge volumes to be treated can be relatively large, it may be preferable to configure system 10 for continuous throughput, although semi-continuous and batch systems are within the scope of the invention.

Sludge feedstock 12 to be treated is diluted with water to a solids weight percent of between about 5% and about 50% to form a slurry and then is passed through screen 14 to remove objectionably large particles, which are discarded as debris 16.

In a feed conditioning vessel 18, the slurry is conditioned by agitation and heating to 180° F. or higher for a time sufficient to melt waxy hydrocarbon solids, reduce the viscosity of the batch, reduce the density of hydrocarbon compounds within the batch, and begin to break surface adhesion of hydrocarbons to fine substrate particles in the sludge. The length of a suitable conditioning period will vary with the type, volume, and mix of sludges presented to the process.

Preferably, vessel 18 is provided with a narrow neck to minimize the surface area of the slurry and thereby to minimize the evolution of hydrocarbon gases therefrom. Vessel 18 is provided with either a controlled inert atmosphere or a controlled air flow in the headspace in the vessel to prevent the concentration of such gases from exceeding the lower explosive limit. Combustible evolved gases may be passed to the atmosphere or may be used advantageously as described hereinbelow.

The slurry in vessel 18 may be heated by steam jacket or, preferably, by direct injection of steam into the waste as supplied from a conventional steam generator (boiler) 20.

After conditioning is substantially complete, the length of conditioning varying with the composition of the sludge being treated and being readily determined experimentally, conditioned slurry is subjected to a first separation step 22, which may employ a filter press or screen and preferably is a high-efficiency disc/bowl centrifuge or a cyclone separator. (Horizontal decanter centrifuges are known to be used in the refinery waste processing art for volume reduction, and they can achieve reasonably good quality of the liquid separation fraction. However, they have relatively low separating efficiencies and typically require the addition of flocculants or coagulating aids to the slurry to achieve adequate separation of solids. The resulting polymer floc can have a spongy structure which reduces cake density and retains unacceptably high levels of water and oils within the cake. It has been found that use of a disc/bowl centrifuge at this stage obviates the requirement for flocculation of the slurry and yields a much denser cake having relatively low liquid content, which is a stated objective of the invention.) Separation 22 may be of batch, semi-continuous, or continuous discharge design.

Typically, greater than 80% of the waste volume is separated in separation step 22. The liquid effluent which contains most of the hydrocarbons from the original waste may be removed 24 for conventional processing to recover the hydrocarbons therefrom or may be treated as described infra.

The first residual substrate cake typically is not yet suitable for landfill disposal or recycle use as it may still contain significant hydrocarbon residues which require further processing.

In a reactor tank 26, the first cake, which may still contain about 5% hydrocarbons, is agitated and diluted with hot water 28, preferably at about 180° F. or higher, to form a second slurry and is treated with an aggressive oxidant 30, for example, hydrogen peroxide, in an amount and for a time sufficient to lyse and/or liberate the residual hydrocarbons still bound to substrate particles in the cake. Some long-chain hydrocarbons may be converted to shorter-chain molecules. This treatment step also may oxidize toxic polycyclic aromatic hydrocarbons to non-toxic derivatives, for example, naphthalene and anthracene may be oxidized to naphthaquinone and anthraquinone, respectively, and the ring structures themselves may be degraded.

In some batch applications wherein the conditioned slurry in vessel 18 readily undergoes phase separation upon cessation of agitation, it is practicable within the scope of the invention to allow the particulates to settle in conditioning vessel 18 and to simply decant the liquid effluent therefrom to provide the first separation without physically passing the slurry through an active separation means such as a filter press, screen, centrifuge, or cyclone separator. In such batch applications, a single vessel may be provided with the capabilities of, and function as, both conditioning vessel 18 and reactor tank 26.

Some volatile hydrocarbons may be generated during this conversion stage, requiring controlled venting of tank 26. Advantageously, these gaseous hydrocarbons may be captured conventionally and burned to fuel steam generator 20 along with similar volatiles from feed digestion vessel 18, thereby enhancing the overall efficiency of the process, or they may be passed to the atmosphere. Addition of water and oxidant may be on a batch, semi-continuous, or continuous feed basis. One or more additional reactor tanks 26a like reactor tank 26 may be employed in parallel with tank 26 to increase the throughput capacity of a sludge processing system in accordance with the invention.

An important benefit of sludge processing in accordance with the invention is the suppression of hydrogen sulfide formation and evolution. Hydrogen sulfide is a toxic gas which is known to be evolved from many types of industrial sludges during processing in accordance with the known art. In the present invention, hydrogen sulfide in a sludge is readily oxidized by the oxidant, preferably hydrogen peroxide, in reactor tank 26 to form sulfites, sulfates, and persulfates which are substantially harmless and typically are retained as salts in the second substrate cake.

Upon completion of the reactor stage in tank 26, the second slurry is supplied to a second separator 32, again preferably a disc/bowl centrifuge or cyclone separator, to remove hydrocarbon compounds generated during the reactor stage of the process. The liquid effluent may be combined with the stream from the first separator 22, and the second residual cake which may contain about 0.5% or less hydrocarbons and typically about 70% solids may be disposed of directly 34, as by landfilling, or further dewatered 36 and/or dried by known means as needed to meet disposal or recycle requirements.

From the foregoing description it will be apparent that there has been provided an improved system (method and apparatus) for processing industrial sludges to recover residual hydrocarbons therefrom and to prepare residual substrate solids for environmentally-acceptable disposal or recycle use, wherein industrial sludges are conditioned in hot water; subjected to a first separation to separate a first liquid containing hydrocarbons and water from a first cake containing substrate solids; subjected to hydrogen peroxide conversion to lyse and/or liberate residual hydrocarbon compounds from substrate solids in the first cake and to convert toxic compounds into non-toxic derivatives; and subjected to second separation to separate remaining liberated hydrocarbon compounds for recycling and to yield a second semi-dry substrate cake suitable for direct landfill disposal, further dewatering, or recycle use. Variations and modifications of the herein described system, in accordance with the invention, will undoubtedly suggest themselves to those skilled in this art. Accordingly, the foregoing description should be taken as illustrative and not in a limiting sense.

What is claimed is:

1. A method of treating industrial sludge comprising substrate particles contaminated with hydrocarbon compounds of high molecular weight to recover hydrocarbon compounds of lower molecular weight therefrom, comprising the steps of:

a) introducing said industrial sludge into a treated aqueous solution to form a fluidized solid particulate material;

b) first separating a first liquid effluent containing a first amount of hydrocarbon compounds from said fluidized material, a second amount of high molecular weight hydrocarbon compounds remaining with said fluidized material;

c) adding an amount of hydrogen peroxide to said fluidized material, said amount being sufficient to lyse said remaining high molecular weight hydrocarbon compounds to form lower molecular weight hydrocarbon compounds and being insufficient to oxidize said compounds to carbon dioxide;

d) lysing by oxidation at ambient pressure and at a temperature less than 100° C. at least a portion of said remaining high molecular weight hydrocarbon compounds to form lower molecular weight hydrocarbon compounds; and e) second separating said lower molecular weight hydrocarbon compounds from said fluidized material.

2. A method in accordance with claim 1 wherein said industrial sludge includes particulates formed of materials selected from the group consisting of metals, ceramics, and plastics, said method further comprising the step of recovering said particulate material in said second separating step.

* * * * *